(12) United States Patent
Friesen

(10) Patent No.: US 10,040,429 B2
(45) Date of Patent: Aug. 7, 2018

(54) HEATED WINDSHIELD WIPER ASSEMBLY

(71) Applicant: Harvey Friesen, Morden (CA)

(72) Inventor: Harvey Friesen, Morden (CA)

( * ) Notice: Subject to any disclaimer, the term of this patent is extended or adjusted under 35 U.S.C. 154(b) by 125 days.

(21) Appl. No.: 15/205,175

(22) Filed: Jul. 8, 2016

(65) Prior Publication Data
US 2017/0129460 A1 May 11, 2017

Related U.S. Application Data

(60) Provisional application No. 62/190,810, filed on Jul. 10, 2015.

(51) Int. Cl.
B60S 1/38 (2006.01)

(52) U.S. Cl.
CPC .......... B60S 1/3805 (2013.01); B60S 1/3848 (2013.01); B60S 1/3881 (2013.01); B60S 1/381 (2013.01); B60S 2001/3836 (2013.01)

(58) Field of Classification Search
CPC .... B60S 1/3848; B60S 1/3805; B60S 1/3803; B60S 1/3881; B60S 1/381
USPC ................. 15/250.06–250.09; 307/9.1, 10.1; 439/620.29, 620.31
See application file for complete search history.

(56) References Cited

U.S. PATENT DOCUMENTS

| 2,550,504 | A | | 4/1951 | Vidrick et al. | |
|---|---|---|---|---|---|
| 3,639,938 | A | * | 2/1972 | Golden | B60S 1/08 15/250.06 |
| 4,387,290 | A | * | 6/1983 | Yasuda | B60S 1/3805 15/250.07 |
| 4,497,083 | A | | 2/1985 | Nielsen, Jr. et al. | |
| 4,846,733 | A | * | 7/1989 | Baisz | H01H 85/2035 439/620.33 |
| 5,325,561 | A | * | 7/1994 | Kotlar | B60S 1/3805 15/250.05 |
| 5,649,337 | A | | 7/1997 | Lobner | |
| 5,831,242 | A | * | 11/1998 | Gallagher | B60S 1/3805 15/250.06 |
| 6,507,973 | B1 | | 1/2003 | Friesen | |
| 7,721,382 | B2 | | 5/2010 | Malone | |
| 8,431,870 | B2 | | 4/2013 | Kim et al. | |
| 9,815,436 | B2 | * | 11/2017 | Kleinsasser | B60S 1/3805 |

(Continued)

FOREIGN PATENT DOCUMENTS

WO 2014121061 8/2014

Primary Examiner — Gary Graham
(74) Attorney, Agent, or Firm — Ryan W. Dupuis; Ade & Company Inc.; Kyle R. Satterthwaiter

(57) ABSTRACT

A heated wiper assembly has a frame for attachment to a windshield wiper arm of a vehicle and a resilient wiper body on the frame. A cover is mounted to the frame along opposing side edges and includes an apex which is raised relative to the side edges of the cover member to define at least one ramped and air deflecting surface and a hollow passage along the cover. A heating element received in the wiper body includes electrical leads extending through the hollow passage in the cover. A controller of the heating element is supported externally of the cover member. The conductive wires of the heating element are received within a common injection molded sheath. A wiring adapter is mounted in place of a fuse within a vehicle fuse box and includes circuits for ready connection of the heating element to a power source of the vehicle.

6 Claims, 2 Drawing Sheets

(56) References Cited

U.S. PATENT DOCUMENTS

2012/0005856 A1* 1/2012 Jones ............... B60S 1/3805
                                                          15/250.07

* cited by examiner

HEATED WINDSHIELD WIPER ASSEMBLY

This application claims the benefit under 35 U.S.C.119(e) of U.S. provisional application Ser. No. 62/190,810, filed Jul. 10, 2015.

FIELD OF THE INVENTION

The present invention relates to wiper assembly including a heated wiper blade for use in vehicular windshield wiper.

BACKGROUND

In colder climates, the build up of ice on vehicle windshield wiper blades is a common problem. The ice causes the wiper blades to operate poorly which is an annoyance to drivers and can become a significant road hazard if the visibility of the driver through the windshield is significantly reduced.

Various wiper heating devices have attempted to overcome the problem of ice build up on wiper blades by mounting a heating element in close proximity to or directly in engagement with the wiper blades. In order for the heating element to operate effectively it is generally required that the heating element directly engage the wiper.

Various examples of heating devices for windshield wipers are described in the following: WO2014121061 by Kleinsasser et al, U.S. Pat. No. 7,721,382 by Malone, U.S. Pat. No. 5,649,337 by Lobner, U.S. Pat. No. 4,497,083 by Nielsen Jr et al, U.S. Pat. No. 8,431,870 by Kim et al, U.S. Pat. No. 2,550,504 by Vidrick et al, and U.S. Pat. No.6,507,973 by Friesen.

Known heating devices however generally mount the heating element integrally within the wiper or wiper blade such that replacement of the wipers requires replacement of the heating element or portions thereof. The periodical replacement of the wipers can thus be expensive and requires time consuming assembly. Alternative arrangements allow for replacement of the heating elements, but in a cumbersome manner which requires significant re-wiring to take place. Alterative arrangements provide wiring which is exposed and unaesthetically pleasing.

Furthermore, known heating devices are generally difficult to connect to the existing wiring of the vehicle, requiring costly installation by trained technicians.

SUMMARY OF THE INVENTION

According to one aspect of the invention there is provided a heated wiper assembly for mounting on a windshield wiper arm, the assembly comprising:

a frame member which is flexible and elongate in a longitudinal direction between two opposing ends;

a frame mount supported centrally on the frame member and arranged to mount the frame member on the windshield wiper arm;

a wiper blade extending longitudinally along the frame member, the wiper blade comprising a resilient body having i) an upper mounting portion secured to the frame member, ii) a lower wiping portion arranged for wiping, and iii) a central passage between the upper mounting portion and the lower wiping portion extending longitudinally through the resilient body of the wiper blade;

a cover member extending longitudinally along the frame member, the cover member comprising i) a pair spaced apart side edges mounted along opposing longitudinally extending side edges of the frame member, ii) an apex which is raised relative to the side edges of the cover member to define at least one ramped and air deflecting surface, and iii) a hollow passage between the side edges extending longitudinally through the cover member;

a heating element slidably received within the central passage of the wiper blade, the heating element comprising two parallel conductive wires each spanning a length of the heating element between a first end of the wire at a first end of the heating element and a second end of the conductive wire at the second end of the heating element where the second ends of the conductive wires are connected with one another;

a pair of leads in connection to respective first ends of the conductive wires of the heating element and having less electrical resistance than the heating element, the pair of leads extending through the hollow passage in the cover member between the first end of the heating element and the frame mount; and a controller coupled to the pair of leads for controlling supply of electricity to the heating element, the controller being supported externally of the cover member.

By locating the leads within the hollow passage of the cover member in connection to both leads of the heating element collectively located at one end of the heating element, the wiring remains hidden in an aesthetically pleasing manner, while remaining much more readily accessible and removable than prior art attempts to hide the wiring of a heated wiper blade.

Preferably the controller comprises a thermostat arranged to be supported on the wiper arm.

Preferably the conductive wires of the heating element are received within a common sheath having an outer diameter which is less than an inner diameter of the central passage of the wiper blade such that the heating element is readily removable from one end of the wiper blade.

When the first ends of the conductive wires of the heating element form a sealed connection with the pair of leads at the first end of the heating element, the sealed connection preferably has an outer diameter which is greater than the inner diameter of the central passage such that the wiper blade is resiliently deformed about the sealed connection to frictionally retain the heating element within the wiper blade.

The conductive wires of the heating element may be received within a common sheath which is injection molded about the conductive wires to fully surround a length of the conductive wires between the first and second ends, including the second ends of the wires which are connected with one another.

When intended for use with a vehicle having a fuse panel locating a plurality of fuse sockets receiving existing fuses therein, the assembly may further include a wiring assembly comprising:

an adapter body comprising:

a pair of conductors arranged to be received in one of the fuse sockets of the fuse panel in place of the respective existing fuse;

a first circuit providing a first auxiliary socket connected in series with the pair of conductors and which is arranged to receive said respective existing fuse therein; and a second circuit providing a second auxiliary socket connected in parallel with the first circuit and which is arranged to receive an auxiliary fuse therein; and an auxiliary lead for connection between the second circuit and one of the pair of leads of the heating element.

According to a second aspect of the present invention there is provided a heated wiper assembly for mounting on a windshield wiper arm, the assembly comprising:

a frame member which is flexible and elongate in a longitudinal direction between two opposing ends;

a frame mount supported centrally on the frame member and arranged to mount the frame member on the windshield wiper arm;

a wiper blade extending longitudinally along the frame member, the wiper blade comprising i) a resilient body having an upper mounting portion secured to the frame member, ii) a lower wiping portion arranged for wiping, and iii) a central passage between the upper mounting portion and the lower wiping portion extending longitudinally through the resilient body of the wiper blade;

a heating element slidably received within the central passage of the wiper blade, the heating element comprising two parallel conductive wires each spanning a length of the heating element between a first end of the wire at a first end of the heating element and a second end of the conductive wire at the second end of the heating element where the second ends of the conductive wires are connected with one another; and a controller coupled to the heating element for controlling supply of electricity to the heating element;

wherein the conductive wires of the heating element are received within a common sheath which is injection molded about the conductive wires to fully surround a length of the conductive wires between the first and second ends, including the second ends of the wires which are connected with one another.

By providing a common sheath injection molded about the conductive wires of the heating element while also locating both connecting leads of the heating element at a common end of the heating element, the wires can more easily be protected from the elements than many prior art configurations.

The common sheath preferably has an outer diameter which is less than an inner diameter of the central passage of the wiper blade such that the heating element is readily removable from one end of the wiper blade.

The assembly may further comprise a pair of leads in connection between the first ends of the conductive wires and the controller, wherein the first of ends of the conductive wires form a sealed connection with the pair of leads at the first end of the heating element and wherein the sealed connection has an outer diameter which is greater than the inner diameter of the central passage such that the wiper blade is resiliently deformed about the sealed connection to frictionally retain the heating element within the wiper blade.

According to another aspect of the present invention there is provided a heated wiper assembly for mounting on a windshield wiper arm of a vehicle further including a fuse panel locating a plurality of fuse sockets receiving existing fuses therein, the wiper assembly comprising:

a frame member which is flexible and elongate in a longitudinal direction between two opposing ends;

a frame mount supported centrally on the frame member and arranged to mount the frame member on the windshield wiper arm;

a wiper blade extending longitudinally along the frame member, the wiper blade comprising i) a resilient body having an upper mounting portion secured to the frame member, ii) a lower wiping portion arranged for wiping, and iii) a central passage between the upper mounting portion and the lower wiping portion extending longitudinally through the resilient body of the wiper blade;

a heating element slidably received within the central passage of the wiper blade, the heating element comprising two parallel conductive wires each spanning a length of the heating element between a first end of the wire at a first end of the heating element and a second end of the conductive wire at the second end of the heating element where the second ends of the conductive wires are connected with one another;

a controller coupled to the heating element for controlling supply of electricity to the heating element;

an adapter body comprising:

a pair of conductors arranged to be received in one of the fuse sockets of the fuse panel in place of the respective existing fuse;

a first circuit providing a first auxiliary socket connected in series with the pair of conductors and which is arranged to receive said respective existing fuse therein; and a second circuit providing a second auxiliary socket connected in parallel with the first circuit and which is arranged to receive an auxiliary fuse therein; and an auxiliary lead for connection between the second circuit and the controller of the heating element.

The use of the adapter body provides a quick and easy method of installing the heated wiper assembly such that a consumer can directly install the heated wiper assembly without necessarily relying on costly technicians to do so.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
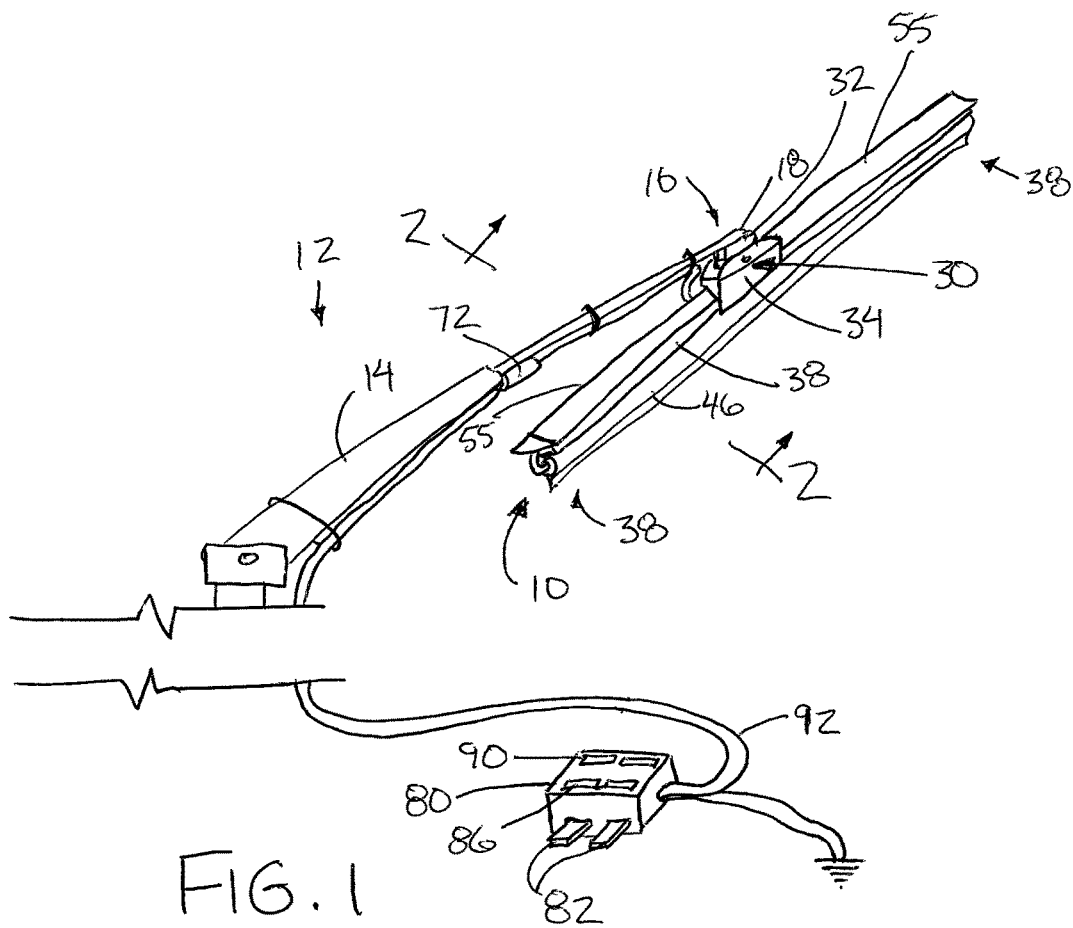
FIG. 1 is a schematic representation of the heated wiper assembly.
Figure 2:
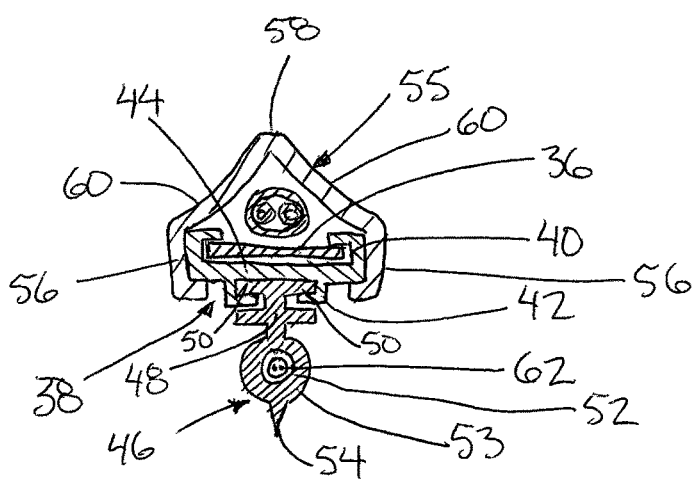
FIG. 2 is a cross-sectional view of the wiper blade.
Figure 3:
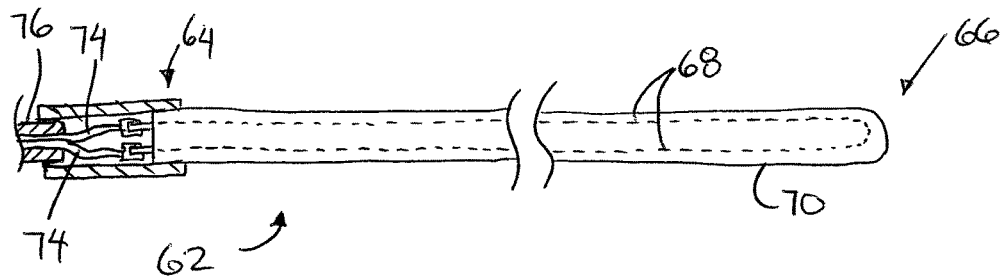
FIG. 3 is a plan view of the heating element.

Referring to the accompanying figures, there is illustrated a vehicular windshield wiper assembly generally indicated by reference numeral 10.

The assembly 10 is particularly suited for a vehicle of the type having a windshield relative to which one or more wipers 12 are supported in a wiping relationship. Each wiper 12 includes an arm 14 pivotally supported at a first end such that the opposing free end 16 is displaced in a side-to-side sweeping motion along the windshield. The wiper arm 14 is also hinged relative to the pivot shaft that controls the side-to-side sweeping motion about a hinge axis which is substantially parallel to the windshield and which cooperates with a spring to bias the free end 16 of the wiper arm into engagement against the windshield. The free end 16 is formed to define a mounting bracket 18 for supporting a replaceable wiper assembly thereon.

The vehicle further includes a battery 20 and a plurality of circuits including an ignition circuit 22 for supplying electrical power from the battery to various components of the vehicle. A fuse panel 24 is provided locating a plurality of fuse sockets 26 therein in which each fuse socket mounts a respective fuse therein in series with a respective one of the circuits. One of the sockets corresponds to an ignition socket locating an ignition fuse therein in series with the ignition circuit 22.

Each wiper assembly 10 includes a frame mount 30 having a first portion arranged to be fixed in connection to the mounting bracket 18 of the wiper arm and a second portion 34 which is hinged relative to the first portion for relative pivotal movement about a hinge axis which is generally parallel to the windshield in the working position.

A spring member 36 of the wiper assembly is elongate in a longitudinal direction to extend substantially the full length of the wiper assembly between two opposing ends 38 thereof. The spring member is formed of a spring metal plate which is intended to be supported in generally parallel relationship with the windshield surface. More particularly, the spring member is concave in the longitudinal direction at the inner side thereof with a bias towards a smaller radius of curvature than the windshield. The biasing of the wiper arm on the frame mount 30 to urge the frame mount centrally located on the frame member towards the windshield acts against the biasing of the spring member to maintain the radius of curvature of the spring member substantially identical to the radius of curvature of the windshield.

Each assembly further includes a mounting frame 38 having an upper channel 40 and a lower channel 42. The mounting frame spans the full length in the longitudinal direction of the wiper assembly between the opposed ends 38. The mounting frame includes a core portion 44 in the form of a plate-like member extending in the longitudinal direction and spanning substantially the full width of the mounting frame in the lateral direction.

The upper channel 40 comprises two opposing side members extending upwardly from opposing side edges of the core portion with the upper free edges being turned inwardly towards one another so that the upper channel has a generally C-shaped cross section which retains the spring metal plate of the spring member 36 laterally therein while enabling the spring member to be longitudinally slidable within the upper channel. The side members of the upper channel are segmented to readily allow flexing and not inhibit the change in radius of curvature relative to the windshield.

The lower channel 42 similarly comprises two side members protruding downwardly in proximity to opposing side edges of the core portion, opposite from the upper channel. The lower free edges of the side members of the lower channel are turned inwardly towards one another such that the lower channel 42 is similarly C-shaped. The lower channel serves to retain a portion of a wiper blade 46 therein such that the wiper blade is restricted laterally but is enabled to be longitudinally slidable relative to the mounting frame.

The wiper blade 46 comprises a unitary body of resilient material which has been extruded so as to be consistent in cross section along the length thereof. The length of the wiper blade corresponds approximately to the length of the frame member between the opposing ends 38 of the wiper assembly.

The wiper blade 46 includes an upright planar core portion 48 lying substantially in a first plane. An upper mounting portion 53 of the wiper blade comprises a pair of support flanges 50 protruding laterally from opposing sides of the top end of the planar core 48 in perpendicular relationship therewith such that the planar core and the opposing support flanges have a generally T-shaped configuration sized and shaped to be matingly received within the C-shaped lower channel 42 of the mounting frame.

The lower end of the planar core 48 is integrally formed with a central portion 53 of the wiper blade which is generally circular in cross section and locates a circular central passage 52 therein which extends the full length of the wiper blade in the longitudinal direction.

A lower wiping portion 54 of the wiper blade protrudes downwardly from the central portion 53 diametrically opposite from the planar core 48 supporting the flanges of the upper mounting portion of the wiper blade. The lower wiping portion comprises a flange which tapers in thickness to an apex at the lower free end while lying substantially in a common plane with the planar core 48 thereabove. The lower wiping portion is thus suited for providing a wiping function in the manner of a squeegee.

The assembly 10 further includes a cover member 55 formed in two separate portions which collectively span substantially the full length of the wiper assembly between the two opposing ends. Each portion of the cover member mounts overtop of a corresponding portion of the upper channel 40 of the mounting frame to span between the centrally located frame mount 30 and a respective one of the two opposing ends 38 of the assembly.

Each portion of the cover member has two lower side edges 56 which are spaced apart laterally to receive the upper channel 40 of the mounting frame therebetween. The bottom free edges of the side edges 56 are hooked inwardly towards one another for being received beneath an undercut portion of the opposing sides of the upper channel 40 of the mounting frame. The cover member further includes a central apex 58 which is raised upwardly away from the mounting frame relative to the two side edges. The resilient material forming the unitary body of each portion of the cover member spans as a ramped surface 60 from each of the two side edges 56 to the central apex 58 therebetween to define two symmetrical ramped surfaces 60 which function as air deflecting surfaces that provide downforce for engagement of the wiper blades against the windshield. The body of each portion of the cover member is hollow between the two side edges to define a triangular hollow passage open to the bottom side of the cover member as described in further detail below.

Each assembly 10 further includes a heating element 62 which is elongate and round in cross section having a suitable outer diameter which is less than the inner diameter of the wiper blade passage 52 so that the heating element is readily slidable into and out of the wiper blade. The heating element spans substantially the full length of the wiper blade between a first end 64 and an opposing second end 66 of the heating element.

The heating element includes two conductive wires 68 received within a common sheath 70 which is injection molded about the conductive wires along the full length thereof. More particularly, the two conductive wires each span longitudinally between a respective first end at the first end of the heating element to a respective second end at the opposing second end of the heating element. The second ends of the two conductive wires are joined in a U-shape such that the conductive wires are connected in series with one another. The common sheath 70 is injection molded about the full length of the wires between the first and second ends thereof as well as about the U-shaped connection at the second end such that the outer diameter thereof remains readily slidable within the wiper blade passage. The conductive wires have a suitable high resistance such that the wires are arranged to generate sufficient heat to melt ice formed on the wiper blade in colder climates when a current is passed through the heating elements.

The control of electricity to the heating element is controlled by a controller 72 in the form of a thermostat which is supported on the corresponding wiper arm 14, external of the wiper assembly. The controller receives electrical power from the vehicle as described in further detail below. The thermostat is arranged to function as a switch which is activated when a sensed ambient temperature falls below a prescribed upper temperature limit for activation.

Two leads 74 communicate between the controller 72 and the first ends of the conductive wires 68 of the heating element. The leads 74 are insulated and received within a common sheath 76 between the controller and the heating element. The leads have sufficient length to extend along a portion of the length of the wiper arm 14 between the controller and the frame mount 30 of the wiper assembly, as well as extending along the length of the mounting frame 38 from the frame mount 30 to the first end of the heating element at one of the two ends 38 of the wiper assembly.

The leads 74 form a sealed connection with the first ends of the heating element which is wrapped with a sealing sheath to form a sealed connection having an outer diameter which is slightly greater than the inner diameter of the wiper blade passage 52. In this manner, the heating element is readily slidable within the wiper blade passage along the length thereof with the exception of the first end which requires a small portion at the first end of the wiper blade to be resiliently deformed about the sealed connection such that the resulting wedged connection of the first end of the heating element into the corresponding end of the wiper blade provides sufficient frictional retention to maintain the heating element in a mounted position within the wiper blade in use.

The leads 74 are less resistant than the conductive wires of the heating element so as to minimize heat loss from the leads and instead concentrate generation of heat at the wiper blade. The leads 74 extend through the triangular passage within one portion of the cover member 55. This is accomplished by providing an aperture in the ramped surface 60 of one portion of the cover member in proximity to the frame mount 30 which receives the common sheath 76 of the two leads therethrough in the mounted position. The aperture in the cover member is suitably sized so that the resilient material of the cover member also provides some resiliently deformed gripping function about the sheath 76 of the leads. At the first end of the heating element, the leads 74 extend through the open bottom end of the respective portion of the cover member which is shown in FIG. 1 to protrude beyond the end of the frame to form the sealed connection with the first ends of the conductive wires of the heating element in proximity thereto.

Figure 4:
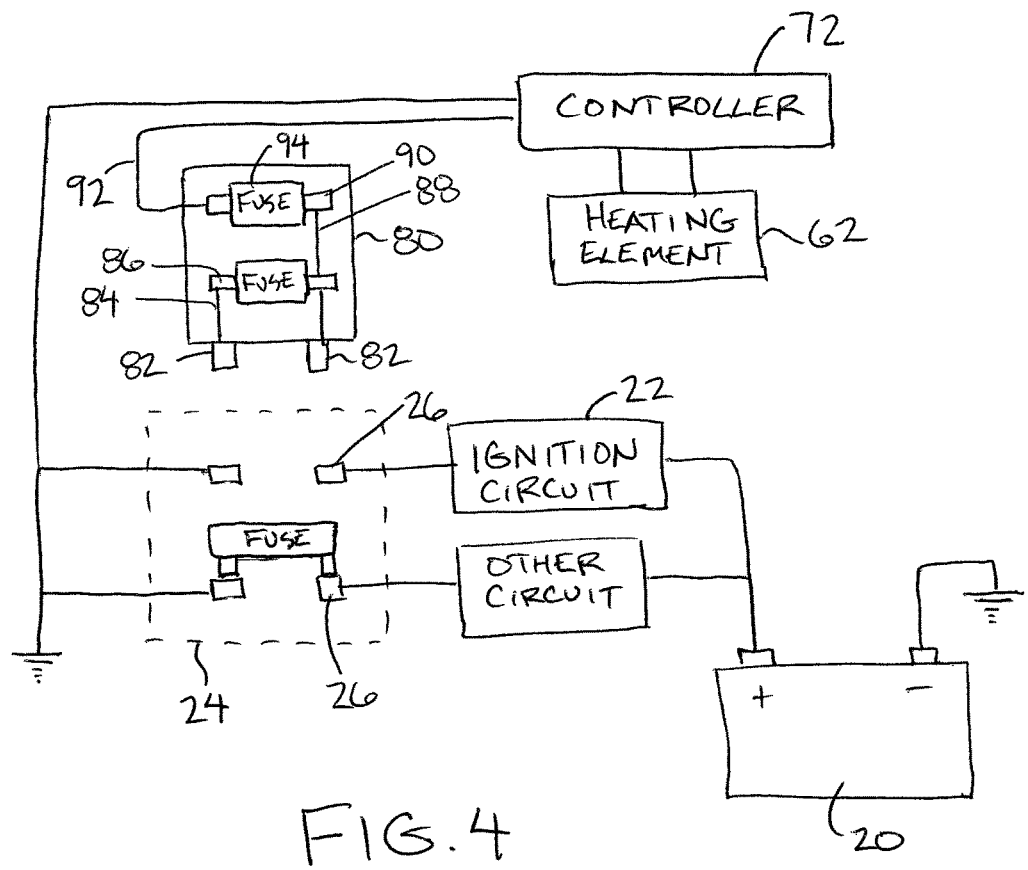
FIG. 4 is a wiring diagram of the adapter body of the wiring assembly.

As best shown in FIG. 4, a wired assembly is provided for providing power from the vehicle to the controller. The wiring assembly includes an adapter body 80 of electrically insulating material which mounts to conductors 82 protruding therefrom. The two conductors 82 are sized and shaped to fit into the ignition fuse socket on the vehicle in place of the existing ignition fuse. A first electrical circuit 84 is provided internally within the adapter body 80 which includes a first socket 86 formed in one side wall of the body which is connected in series with the two conductors 82 by the first circuit. The first socket 86 is configured to receive the ignition fuse therein such that the ignition fuse remains connected in series with the ignition circuit.

The adapter body 80 further includes a second circuit 88 internally within the body which includes a second socket 90. The second circuit couples the second socket in parallel with the first circuit. The adapter body further includes an auxiliary lead 92 which communicates externally from the adapter body for connection to the power supply input of the controller 72. The other electrical connection of the controller connects to the ground of the vehicle. The second circuit 88 functions to connect the second socket 90 in series between the first circuit 84 and the controller 72. The second socket receives an auxiliary fuse 94 therein such that the auxiliary fuse is in series between the power source and the heating element.

The heated wiper assembly described herein is intended to be mounted on the wiper arm of a vehicle in place of an existing wiper assembly by removing the factory installed wiper assembly from the mounting bracket 18 at the free end of the wiper arm. The frame mount 30 of the wiper assembly 10 is then mounted on the free end of the wiper arm. The controller 72 is secured at a central location along the wiper arm, for example using various types of disposable ties or tape and the like, such that the leads 74 within the common sheath 76 extend along the wiper arm between the frame mount 30 and the controller 72. The remainder of the wiring is supported along the wiper arm up to the pivotal connection to the vehicle and then under the hood of the vehicle for subsequent connection to the adapter body 80. The adapter body 80 is mounted into the ignition circuit at the fuse panel of the vehicle. In this manner, the heated wiper assembly only receives electrical power when the ignition circuit is activated. The controller in turn ensures that electrical power is only provided to the heating element when the ambient temperature is below the prescribed Upper temperature limit. The adapter body enables quick connection to the ignition circuit without any rewiring of the vehicle, while maintaining the ignition circuit protected by the existing ignition fuse and further providing the heating element with protection by an auxiliary fuse 94.

Since various modifications can be made in my invention as herein above described, it is intended that all matter contained in the accompanying specification shall be interpreted as illustrative only and not in a limiting sense.

The invention claimed is:

1. A heated wiper assembly for mounting on a windshield wiper arm, the assembly comprising:
   a frame member which is flexible and elongate in a longitudinal direction between opposing first and second ends of the frame;
   a frame mount supported centrally on the frame member and arranged to mount the frame member on the windshield wiper arm;
   a wiper blade extending longitudinally along the frame member between opposing first and second ends of the wiper blade located at the first and second ends of the frame, the wiper blade comprising a resilient body having i) an upper mounting portion secured to the frame member, ii) a lower wiping portion arranged for wiping, and iii) a central passage between the upper mounting portion and the lower wiping portion extending longitudinally through the resilient body of the wiper blade;
   a cover member extending longitudinally along the frame member, the cover member being formed of resilient material and comprising i) a pair spaced apart side edges mounted along opposing longitudinally extending side edges of the frame member, ii) an apex which is raised relative to the side edges of the cover member to define at least one ramped and air deflecting surface, iii) a hollow passage between the side edges extending longitudinally through the cover member, iv) an open bottom end in a portion of the cover member protruding beyond the first end of the frame, and v) an opening in the resilient material at the frame mount;

a heating element slidably received within the central passage of the wiper blade, the heating element comprising two parallel conductive wires each spanning a length of the heating element between a first end of the wire at the first end of the wiper blade and a second end of the conductive wire at the second end of the wiper blade where the second ends of the conductive wires are connected with one another;

a pair of leads in connection to the first ends of the conductive wires of the heating element respectively and having less electrical resistance than the conductive wires of the heating element, the pair of leads both extending together from the heating element through the open bottom end of the portion of the cover member protruding beyond the first end of the frame, through the hollow passage in the cover member between the first end of the frame and the frame mount, and through the opening in the resilient material of the cover member at the frame mount; and a controller coupled to the pair of leads for controlling supply of electricity to the heating element, the controller being supported externally of the cover member.

2. The assembly according to claim 1 wherein the controller comprises a thermostat arranged to be supported on the wiper arm.

3. The assembly according to claim 1 wherein the heating element has an overall outer diameter which is less than an inner diameter of the central passage of the wiper blade such that the heating element is readily removable from one end of the wiper blade.

4. The assembly according to claim 3 wherein the first ends of the conductive wires of the heating element form a sealed connection with the pair of leads at the first end of the heating element, the sealed connection having an outer diameter which is greater than the inner diameter of the central passage such that the wiper blade is resiliently deformed about the sealed connection to frictionally retain the heating element within the wiper blade.

5. The assembly according to claim 1 wherein the conductive wires of the heating element are received within a common sheath which is injection molded about the conductive wires to fully surround a length of the conductive wires between the first and second ends, including the second ends of the conductive wires which are connected with one another.

6. The assembly according to claim 1 for use with a vehicle having a fuse panel locating a plurality of fuse sockets receiving existing fuses therein, the assembly further comprising a wiring assembly comprising:

an adapter body comprising:

a pair of conductors arranged to be received in one of the fuse sockets of the fuse panel in place of the respective existing fuse;

a first circuit providing a first auxiliary socket connected in series with the pair of conductors and which is arranged to receive said respective existing fuse therein; and a second circuit providing a second auxiliary socket connected in parallel with the first circuit and which is arranged to receive an auxiliary fuse therein; and an auxiliary lead for connection between the second circuit and one of the pair of leads of the heating element.

* * * * *